Feb. 6, 1945.  A. J. ROSENBERGER  2,368,616

LIQUID LEVEL GAUGE

Filed Aug. 5, 1943

Inventor
Albert J. Rosenberger
by *Lawton Down & Good*
Attorneys

Patented Feb. 6, 1945

2,368,616

UNITED STATES PATENT OFFICE 2,368,616

LIQUID LEVEL GAUGE

Albert J. Rosenberger, Chicago, Ill., assignor to Republic Flow Meters Company, Chicago, Ill., a corporation of Illinois Application August 5, 1943, Serial No. 497,421

13 Claims. (Cl. 73—299)

This invention relates to liquid level gauges and more particularly to apparatus for indicating the amount of liquid in a tank or container.

One of the objects of the invention is to provide a liquid level gauge which can be utilized to give an indication at a remote point.

Another object of the invention is to provide a liquid level gauge which is operated by fluid pressure. Preferably the gauge operates on vacuum although, if desired, it can be operated equally well on a positive pressure.

Still another object of the invention is to provide a liquid level gauge which indicates the weight of liquid in the tank or container. This construction automatically compensates for variations in density due to temperature changes.

A further object of the invention is to provide a liquid level gauge which is not affected by changes in pressure in the tank or container.

A still further object of the invention is to provide a liquid level gauge in which variations in pressure adjacent the tank and adjacent the indicator are compensated.

The above and other objects and advantages of the invention will be more readily apparent from the following description when read in connection with the accompanying drawing, in which—

Figure 1:
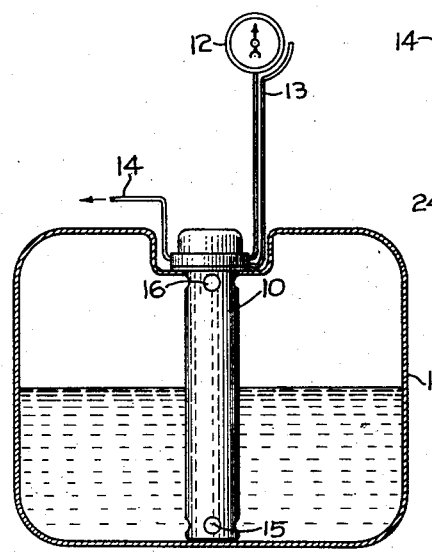
Figure 1 is a diagrammatic section illustrating an installation of a gauge embodying the invention in a tank.

The gauge of the present invention is adapted to be enclosed in a tube 10 which is mounted vertically in a tank or container 11 containing liquid, as shown. The gauge mechanism 10 is connected to an indicator 12 which may be mounted at any desired point remote from the tank and a pipe 13 leads from a point adjacent the indicator into the gauge mechanism to compensate for variations in pressure at the tank and the indicator location as will be explained hereinafter. The gauge mechanism may be operated by fluid under pressure or by vacuum conducted thereto by a pipe 14 from any suitable source.

Figure 2:
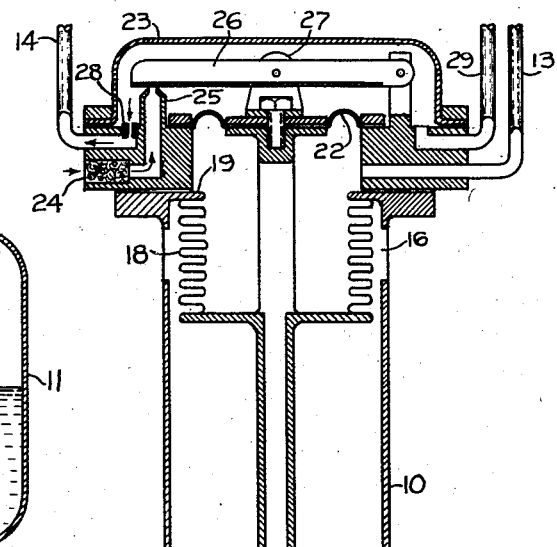
Figure 2 is an enlarged section of the gauge mechanism.

As best seen in Figure 2, the pipe 10 is formed with openings 15 adjacent its lower end and openings 16 adjacent its upper end communicating with the tank adjacent the bottom and top thereof respectively. A flexible diaphragm unit shown as a bellows 17 is mounted in the lower end of the tube and is sealed against the bottom thereof so that its exterior will be exposed to the pressure in the bottom of the tank 11. A similar bellows 18 which is matched with the bellows 17 is mounted in an inverted position in the upper end of the tube and has its edge sealed against a flange 19 at the top of the tube. The two bellows are mechanically connected by a pipe 21 extending vertically through the tube and which establishes fluid communication between the interiors of the bellows to equalize the pressure therein.

The downward force exerted by the bellows is balanced by a force producing mechanism controlled by movement of the bellows. This mechanism as shown comprises a flexible diaphragm 22 above the upper bellows connected to the pipe 21 to move therewith and open on its lower side to the interior of the bellows. The pipe 13 communicates with the space below the diaphragm 22 as shown.

The upper side of the diaphragm is enclosed by a cover 23 and the pressure therein is regulated by movement of the diaphragm and bellows. For this purpose an atmospheric vent covered by filtering material or the like 24 communicates with a nozzle 25 inside the cover 23. The nozzle 25 is controlled by a flap valve 26 pivoted at one end on the mounting for the diaphragm and connected intermediate its ends to a yoke 27 fastened to the upper side of the diaphragm 22. The space within the cover communicates through a restricted orifice 28 with the pipe 14 which is connected to a source of vacuum. The space in the cover 23 is also connected through a pipe 29 with the indicator 12 so that the indicator will be operated in accordance with the degree of vacuum above the diaphragm 22.

When the gauge mechanism is installed in a tank, the lower bellows 17 will be subjected on its exterior to the pressure within the tank including any static pressure above the liquid plus the weight of the liquid column above the bellows. The bellows 18 at the top of the tank will be subjected only to the static pressure above the liquid so that the net effect will be a downward force proportional to the weight of the column of liquid in the tank. This downward force is balanced by the differential pressure across the diaphragm 22, the degree of vacuum required to rebalance the downward force being transmitted to the indicator 12 through the pipe 29 so that the indicator will indicate the weight of the column of liquid in the tank. In the event that there is any difference in pressure between the space surrounding the indicator and the atmospheric pressure around the tank, as for example, in aircraft with a super charged cabinet the pressure difference will be compensated by the pipe 13 so that the indicator will at all times indicate accurately the weight of the column of liquid in the tank.

As the liquid level drops the downward force exerted by the bellows will decrease and the diaphragm 22 will tend to rise to move the flapper 26 away from the orifice 25. This will admit more air to the space above the diaphragm 22 reducing the vacuum therein until the degree of vacuum is just sufficient to balance the downward force exerted by the bellows. Upon an increase in liquid level the downward force of the bellows will increase, restricting the orifice 25 so that the vacuum above the diaphragm 22 will increase proportionately.

To prevent erratic operation of the gauge due to operation of liquid in the tank or the like, the openings 15 and 16 may be restricted to have a damping effect. This will slightly delay equalizing of pressures on the interior of the tube 10 and in the tank and will cause the gauge to operate somewhat more slowly without, however, affecting its accuracy. If the tank is operated under increased pressure to assist in forcing fuel therefrom, the pressure will operate to the same extent on the bellows 17 and 18 and will thereby be compensated so as not to affect readings of the indicator. In the case of tanks which are operated at all times under atmospheric pressure, the compensating bellows 18 may be omitted and the remainder of the apparatus will function in the same manner as described above.

Figure 3:
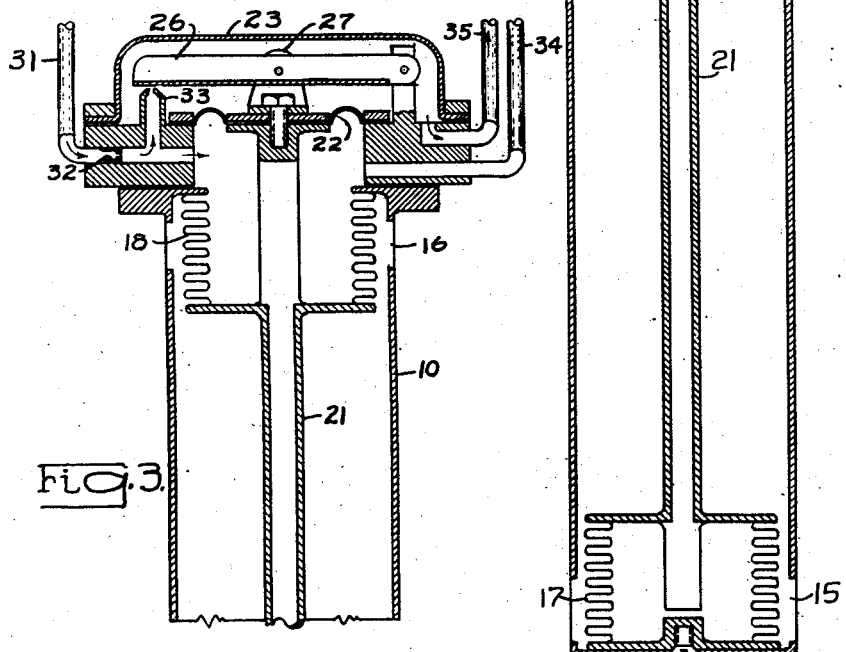
Figure 3 is a partial section similar to Figure 2 of a pressure operated mechanism.

Figure 3 illustrates a construction similar to that shown in Figure 2 and parts therein identical with corresponding parts in Figure 2 have been marked with the same reference numerals. The construction of Figure 3 is adapted to be operated by fluid under positive pressure which is supplied through a pipe 31. The pipe 31 communicates through an orifice 32 with the space below the diaphragm 22 which is open to the interior of the bellows 18 and with a nozzle or orifice 33 extending into the space beneath the cover plate 23 above the diaphragm 22. The orifice 33 is controlled by the valve lever 26 in the same manner as the orifice 25 of Figure 2.

The space below the diaphragm 22 is connected by a pipe 34 with a pressure gauge similar to the gauge 12 which may be calibrated to indicate in terms of the weight of liquid in the tank and the space around the gauge is connected through a pipe 35 to the space beneath the cover plate 23 to compensate for any differences in atmospheric pressure.

In operation, a downward force on the bellows and diaphragm caused by the weight of the liquid column tends to move the valve 26 against the orifice 33 to increase the pressure below the diaphragm 22. It will be noted that the pressure increase acting on bellows 18 will be compensated by an identical increase acting on the lower bellows 17 so that the net result of the pressure increase is an upward force on the diaphragm 22. The pressure will increase to a point sufficient to return the valve 26 to its neutral position and will be transmitted through the pipe 34 to the gauge to indicate the weight of liquid in the tank. The upper side of the diaphragm 22 will always be at the same pressure as that around the gauge due to the connection through pipe 35 so that the gauge will indicate accurately the weight of the liquid column in the tank.

While two embodiments of the invention have been shown and described, it will be understood that these are illustrative only and are not to be taken as a definition of the scope of the invention, reference being had for this purpose to the appended claims.

What is claimed is:

1. A liquid level gauge comprising a tube adapted to project vertically into a liquid tank and communicating with the tank adjacent its upper and lower ends, a flexible bellows in the tube sealed against the bottom of the tube, a second flexible bellows adjacent the top of the tube sealed around the periphery of the tube, a pipe connecting the movable ends of the bellows to establish fluid communication between the interiors thereof, a flexible diaphragm above the second bellows and connected to the bellows, a valve controlled by movement of the bellows and diaphragm to regulate the pressure above the diaphragm, and an indicator responsive to the pressure above the diaphragm.

2. A liquid level gauge comprising a tube adapted to project vertically into a liquid tank and communicating with the tank adjacent its upper and lower ends, a flexible bellows in the tube sealed against the bottom of the tube, a second flexible bellows adjacent the top of the tube sealed around the periphery of the tube, a pipe connecting the movable ends of the bellows to establish fluid communication between the interiors thereof, a flexible diaphragm above the second bellows and connected to the bellows, a valve controlled by movement of the bellows and diaphragm to regulate the pressure above the diaphragm, an indicator responsive to the pressure above the diaphragm, and a conduit connecting the space around the indicator to the interiors of the bellows.

3. In a liquid level gauge for measuring the liquid level in a tank, a pair of vertically spaced hollow bodies each having an end wall movable under pressure, one side of the end walls being adapted to be exposed to the pressures at vertically spaced points in the tank, means connecting said end walls for movement together, and force producing mechanism connected to the end walls to move with the end walls, means connected to the force producing mechanism to supply operating energy thereto, and control means connected to the force producing mechanism and the end walls to be moved thereby to control the supply of operating energy to the force producing mechanism to control the force produced by the force producing mechanism so that it will balance the difference in pressure on the hollow bodies.

4. In a liquid level gauge for measuring the liquid level in a tank, a pair of vertically spaced hollow bodies each having an end wall movable under pressure, one side of the end walls being adapted to be exposed to the pressures at vertically spaced points in the tank, means connecting said end walls for movement together, means controlled by movement of the end walls to produce a regulated fluid pressure, and means responsive to the regulated fluid pressure connected to the end walls to balance the difference in pressure thereon.

5. In a liquid level gauge for measuring the liquid level in a tank, a pair of vertically spaced hollow bodies each having an end wall movable under pressure, one side of the end walls being adapted to be exposed to the pressures at vertically spaced points in the tank, means connecting said end walls for movement together, means controlled by movement of the end walls to produce a regulated fluid pressure, means responsive to the regulated fluid pressure connected to the end walls to balance the difference in pressure thereon, an indicator connected to the controlled means to be operated by the regulated pressure, and means connecting the space adjacent the indicator to the other sides of the end walls.

6. In a liquid level gauge for measuring the liquid level in a tank, a pair of vertically spaced hollow bodies each having an end wall movable in response to pressure in opposite directions, the exteriors of said hollow bodies being adapted to be exposed to the pressures at vertically spaced points in the tank, means connecting the end walls for movement together and connecting the interiors of the hollow bodies to equalize the pressures therein, and force producing mechanism connected to the end walls to move with the end walls, means connected to the force producing mechanism to supply operating energy thereto, and control means connected to the force producing mechanism and the end walls to be moved thereby to control the supply of operating energy to the force producing mechanism to control the force produced by the force producing mechanism so that it will balance the difference in pressure on the hollow bodies.

7. In a liquid level gauge for measuring the liquid level in a tank, a pair of vertically spaced hollow bodies each having an end wall movable in response to pressure in opposite directions, the exteriors of said hollow bodies being adapted to be exposed to the pressures at vertically spaced points in the tank, means connecting the end walls for movement together and connecting the interiors of the hollow bodies to equalize the pressures therein, means controlled by movement of the end walls to produce a regulated fluid pressure, and means responsive to the regulated pressure connected to the end walls to balance the difference in pressure thereon.

8. In a liquid level gauge for measuring the liquid level in a tank, a pair of vertically spaced hollow bodies each having an end wall movable in response to pressure in opposite directions, the exteriors of said hollow bodies being adapted to be exposed to the pressures at vertically spaced points in the tank, means connecting the end walls for movement together and connecting the interiors of the hollow bodies to equalize the pressures therein, means controlled by movement of the end walls to produce a regulated fluid pressure, means responsive to the regulated pressure connected to the end walls to balance the difference in pressure thereon, an indicator connected to the controlled means to be operated by the regulated pressure, and means connecting the space adjacent the indicator to the interior of the hollow bodies.

9. A liquid level gauge comprising a pair of vertically spaced hollow bodies having end walls movable in response to the pressure at vertically spaced points in a liquid tank, means connecting the end walls for movement together and to equalize the pressure inside the hollow bodies, a flexible diaphragm connected to the end walls and exposed on its lower side to the pressure on the inside of the hollow bodies, a control valve operated by movement of the end walls to produce a variable degree of vacuum above the diaphragm, and an indicator responsive to the vacuum above the diaphragm.

10. A liquid level gauge comprising a pair of vertically spaced hollow bodies having end walls movable in response to the pressure at vertically spaced points in a liquid tank, means connecting the end walls for movement together and to equalize the pressure inside the hollow bodies, a flexible diaphragm connected to the end walls and exposed on its lower side to the pressure on the inside of the hollow bodies, a control valve operated by movement of the end walls to produce a variable degree of vacuum above the diaphragm, an indicator responsive to the vacuum above the diaphragm, and a conduit connecting the space around the indicator to the space inside the hollow bodies.

11. In a liquid level gauge for measuring the liquid level in a tank, a hollow body adapted to be mounted in the tank adjacent the bottom thereof and having an end wall movable in response to the pressure thereon, a force producing mechanism connected to the end wall to move therewith, and means controlled by movement of the end wall and the force producing mechanism to control the force exerted by the force producing mechanism so that it will balance the pressure on the end wall.

12. In a liquid level gauge for measuring the liquid level in a tank, a hollow body adapted to be mounted in the tank adjacent the bottom thereof and having an end wall movable in response to the pressure thereon, means connecting the interior of the hollow body to a space exterior to the tank, fluid pressure responsive means connected to the end wall for movement therewith, and means controlled by movement of the end wall and fluid pressure responsive means to produce a regulated pressure to which the fluid pressure responsive means is responsive so that it will balance the pressure on the end wall.

13. In a liquid level gauge for measuring the liquid level in a tank, a hollow body adapted to be mounted in the tank adjacent the bottom thereof and having an end wall movable in response to the pressure thereon, a diaphragm connected to the end wall for movement therewith and to equalize the pressures on one side of the diaphragm and in the hollow body, and valve means controlled by movement of the end wall and the diaphragm to control the pressure on the other side of the diaphragm.

ALBERT J. ROSENBERGER.